United States Patent [19]
DeGroot

[11] Patent Number: 4,766,564
[45] Date of Patent: Aug. 23, 1988

[54] DUAL PUTAWAY/BYPASS BUSSES FOR MULTIPLE ARITHMETIC UNITS

[75] Inventor: Richard D. DeGroot, Yorktown Heights, N.Y.

[73] Assignee: International Business Machines Corporation, Armonk, N.Y.

[21] Appl. No.: 639,754

[22] Filed: Aug. 13, 1984

[51] Int. Cl.⁴ .............................................. G06F 7/38
[52] U.S. Cl. .................................................... 364/748
[58] Field of Search ........ 364/736, 748, 200 MS File, 364/900 MS File

[56] References Cited

U.S. PATENT DOCUMENTS

| | | | |
|---|---|---|---|
| 3,697,734 | 10/1972 | Booth et al. | 364/748 |
| 4,075,704 | 2/1978 | O'Leary | 364/748 |
| 4,179,734 | 12/1979 | O'Leary | 364/200 |
| 4,205,373 | 5/1980 | Shah et al. | 364/200 |
| 4,490,807 | 12/1984 | Chevillat et al. | 364/736 |
| 4,507,728 | 3/1985 | Sakamoto et al. | 364/200 |
| 4,553,203 | 11/1985 | Rau et al. | 364/736 |
| 4,594,655 | 6/1986 | Hao et al. | 364/736 |
| 4,594,660 | 6/1986 | Guenthner et al. | 364/200 |
| 4,626,989 | 12/1986 | Torii | 364/200 |
| 4,630,195 | 12/1986 | Hester et al. | 364/200 |
| 4,639,886 | 1/1987 | Hashimoto et al. | 364/749 |

OTHER PUBLICATIONS

Sofer et al., "Parallel Pipeline Organization of Execution Unit", IBM Technical Disclosure Bulletin, vol. 14, #12, pp. 2930–2933, Mar. 1972.
Tomasulo, "An Efficient Algorithm for Exploiting Multiple Arithmetic Units", IBM Journal, Jan. 1977, pp. 25–33.
Ramamoorthy et al., "Computing Surveys", vol. 9, #1, 3/1977, pp. 61–85.
Bernhard, "Giants in Small Packages", IEEE Spectrum, pp. 39–44, Feb. 1982.

Primary Examiner—Gary V. Harkcom
Assistant Examiner—Dale M. Shaw
Attorney, Agent, or Firm—Jack M. Arnold; Terry J. Ilardi

[57] ABSTRACT

A data processing system includes multiple floating point arithmetic units, for example, an adder and a multiplier. Two putaway busses and two bypass busses are connected to a register file and waiting stages, associated with the arithmetic units, respectively. A special source register is included for keeping track of the source of any result on the busses so that the registers may be connected to the appropriate bus on which the result is to appear in accordance with a busy or mark bit set in each register in the file and in the waiting stage. This allows multiple data items to exit the pipes during any cycle. Therefore, two or more results are produced each cycle.

3 Claims, 3 Drawing Sheets

4,766,564

DUAL PUTAWAY/BYPASS BUSSES FOR MULTIPLE ARITHMETIC UNITS

TECHNICAL FIELD

The invention is in the field of arithmetic units for computing systems, and in particular is directed to floating point arithmetic units.

BACKGROUND ART

Many computer programs are characterized as having a large number of floating point arithmetic operations. As a consequence, a large number of the instructions executed by the machine are floating-point instructions (floating add, floating subtract, floating multiply, floating compare, etc.). For such programs, the greater the number of floating-point arithmetic instructions that can be executed per cycle, the faster the machine speed of operation. Arithmetic results produced by the floating-point arithmetic unit must be saved, in a register-file, for instance, for later use and for eventual storage into memory. Although many designs for arithmetic units allow multiple arithmetic operations to be in execution at once, most allow only one actual result be produced each cycle.

The IBM model 360/91 is an example of a machine with multiple floating point arithmetic units. As arithmetic results exit from one of the arithmetic units, they are placed on a putaway (result) bus where they travel to the register file and enter a predetermined register for which they are destined. In addition, the results travel along a special bypass bus which is connected to the waiting stages associated with each arithmetic unit. If any instruction in a waiting list is waiting for the newly produced result, the result is entered into one of the buffers in the waiting stations. In this way, performance is increased by not requiring waiting instructions to wait while the needed result is first gated into the register file and then gated from the register file into the waiting station. A complete description of this scheme may be found in "An Efficient Algorithm for Exploiting Multiple Arithmetic Units" by R. M. Tomasulo, IBM Journal, January 1967, pp. 25-33. Since there is only one putaway bus and one bypass in the Tomasulo scheme, only one floating point result may be produced each cycle.

U.S. Pat. No. 4,075,704 to O'Leary describes a floating point data processor for high speed operation, which includes two arithmetic units and two putaway busses. Both busses pass back to both arithmetic units. However, each bus enters only one side of each arithmetic unit.

Although the drawings in O'Leary illustrate multiple entries into each side of the arithmetic unit, these are controlled by the decoder (central control). Thus, O'Leary's scheme allows only a single data item, that is a result, to enter a given side of the pipeline during any cycle, and O'Leary's scheme requires central control.

U.S. Pat. No. 3,697,734 to Booth et al sets forth a digital computer utilizing a plurality of parallel asynchronous arithmetic units, which include a bussing scheme similar to O'Leary, in that only one arithmetic result is produced each cycle.

IBM Technical Disclosure Bulletin, Vol. 14, No. 10, March 1972, pp. 2930-2933 in an article by Sofa et al sets forth a floating point arithmetic scheme in which a single arithmetic result is allowed onto the pipeline during each cycle.

In an article by Ramamoorthy in "Computing Surveys", Vol. 9, No. 1, March 1977, pp. 61-85, various schemes are set forth for making floating point arithmetic operations, with each of the schemes allowing only one arithmetic result to enter the pipeline during each cycle.

According to the present invention, a floating point arithmetic unit is described which utilizes dual putaway/bypass busses which allows multiple arithmetic results to be produced and enter the pipeline in each cycle of operation. That is, an add result may appear on one bus and a multiply result on the other bus during the same cycle of operation.

DISCLOSURE OF THE INVENTION

Apparatus is disclosed for producing two or more arithmetic floating point results in a given cycle of operation. The arithmetic unit includes an adder and a multiplier and two putaway busses and two bypass busses which are connected to a register file and waiting stages associated with the respective floating point arithmetic units. A special source register keeps track of the source of any result on the busses so that the registers may be connected to the bus on which the result is to appear in accordance with a busy or mark bit set in each register in the file and in the waiting stages. This allows multiple data items to exit the pipe during any cycle, such that two or more results are produced each cycle.

BEST MODE OF CARRYING OUT THE INVENTION

Figure 1:
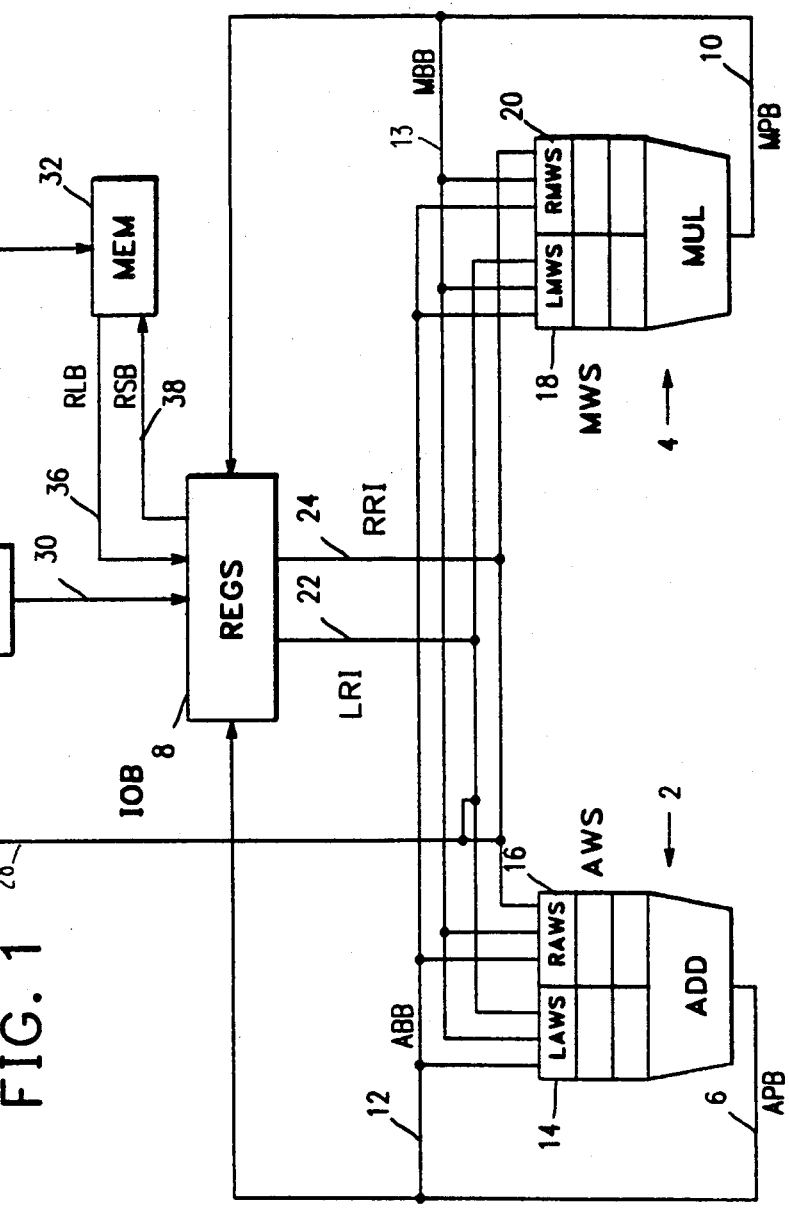
FIG. 1 is a block diagram representation of a floating point arithmetic unit according to the present invention, in which dual putaway/bypass busses are utilized.

FIG. 1 is a block diagram of a floating point arithmetic unit according to the present invention. The unit is comprised of an adder pipeline unit 2, a multiplier pipeline unit 4, with the output of the adder pipeline unit being connected via an adder putaway bus (APB) 6 to a register file 8, with the output of the multiplier pipeline unit being connected via a multiplier putaway bus (MPB) 10 to the register file 8. The adder putaway bus is also connected to an adder bypass bus (ABB) 12 which is connected to a left adder wait station 14 and a right adder wait station 16 as well as a left multiplier wait station 18 and a right multiplier wait station 20. The multiplier putaway bus 10 is also connected to a multiplier bypass bus (MBB) 13 which is connected to the left adder wait stations 14, the right adder wait station 16, the left multiplier wait station 18 and the right multiplier wait station 20. The register file 8 is connected via a left register input bus (LRI) 22 to the left adder wait station and the left multiplier wait station 14 and 18, respectively, with a right register input bus (RRI) 24 being connected to the right adder wait station and right multiplier wait stations 16 and 20, respectively. An instruction register 26 is connected via an instruction operand bus (IOB) 28 to the respective wait stations, as well as being connected via a bus 30 to the register file 8. The central processing memory unit 32 provides an input to the instruction register 26 via a bus 34, and an input to the register file 8 via a register load bus (RLB) 36, and receives an input from the register file 8 via a register store bus (RSB) 38. The instruction register 26 and memory 32 are included in the overall central processing unit (CPU), not shown, and are operative with, but not part of the arithmetic unit herein described. The instruction register 26 sequentially receives instructions from the central memory 32 and executes them. As the instructions are executed, floating-point numbers are transferred between the register file 8 and memory 32, and certain operations on these numbers are initiated within the arithmetic unit.

Although many types of arithmetic instructions are allowed, such as, addition, subtractions, inversions, comparisons, multiplications, divisions, and so on, instructions are divided into two classes: adder-type instructions and multiply-type instructions, although more classes are permissible given one pipeline unit for each class. All instructions executed by the arithmetic unit are assumed to be of the form

FLOP SR1, SR2, TR where FLOP specifies the floating-point operation to be performed (add, subtract, etc.), SR1 and SR2 designate the two source registers or operands, and TR specifies the target register. SR1, SR2, and TR are all registers in the register file. For example,

FADD R1, R7, R12, specifes that the value in register 1 is to be added to the value in register 7 and that the result is to be stored in register 12. In normal execution, when an arithmetic instruction is executed, the two specified source registers are gated out of the register file and are sent to the appropriate pipeline execution unit based on the class of operation. Some number of cycles later, the result of the operation is produced by the pipeline unit and stored away in the specified target register. It is possible for new instructions to be entered into a pipeline unit before all previous instructions in the unit have completed execution. Furthermore, results can emerge from a pipeline unit in an order different than the order in which they enter. Finally, a result can emerge from one pipeline before a result from the other pipeline even though the instruction for the second result was initiated first.

Figure 2:
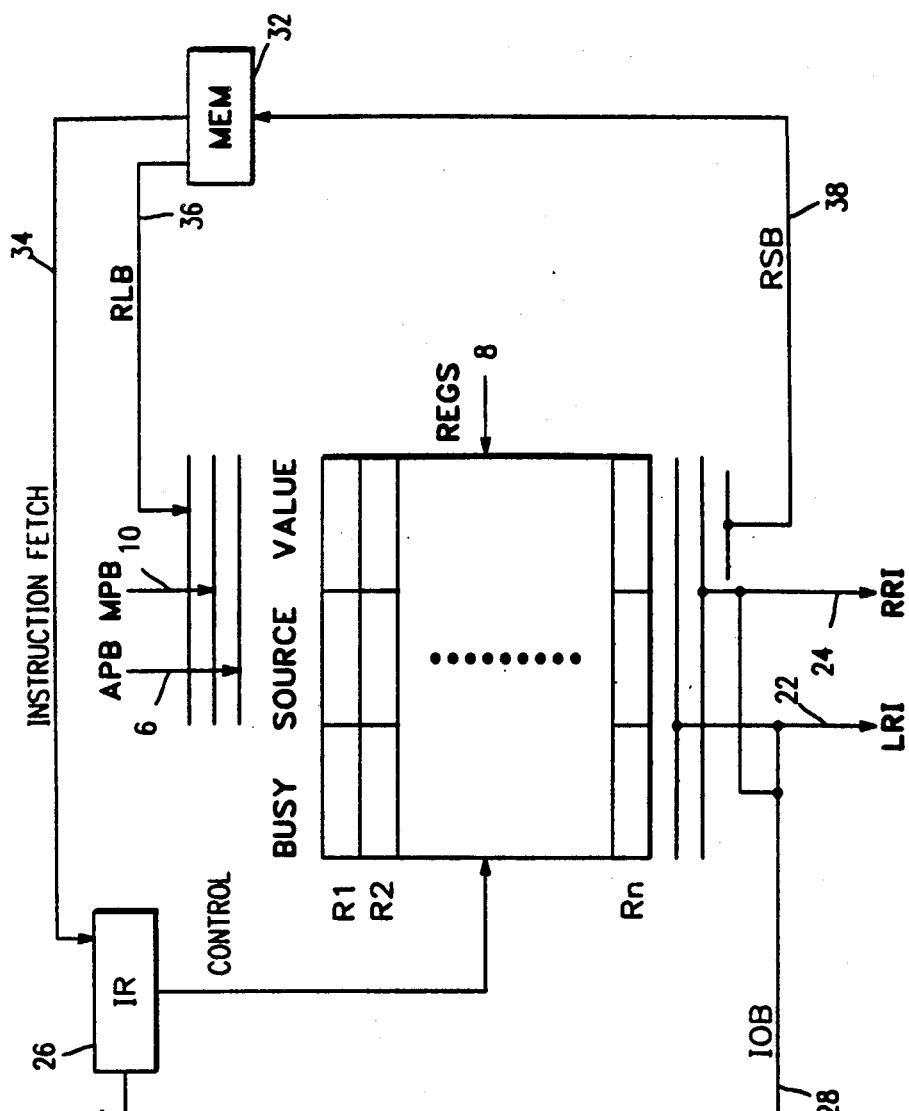
FIG. 2 is a detailed block diagram representation of the register file illustrated generally in FIG. 1.

The register file 8 is shown in detail in FIG. 2. There are included therein a number of floating-point registers, denoted as R1 through Rn. Each register has a value field which holds the register value, a "source" bit, and a "busy" bit. The n registers together comprise the register file. Three busses, the adder putaway bus 6, the multiplier putaway bus 10 and the register load bus 36 enter the register file, and three busses, the left register input bus 22, the right register input bus 24 and the register store bus 38 leave the register file, although these may actually be multiplexed into two input or two output busses. Data values can be stored from the register file 8 into memory 32 over the register storage bus 38. Data values can be loaded from the memory 32 into the register file 8 over the register load bus 36. As values are produced by the adder unit, those values are stored into the register file 8 via the adder putaway bus 6. Similarly, values produced by the multiplier unit are stored into the register file 8 over the multiplier putaway bus 10. When a floating-point operation is decoded, in general, two source registers are specified, SR1 and SR2. Either of these may designate any of the registers R1 through Rn. The designated register for SR1 is output onto the left register input bus 22, and the designated register for SR2 is output onto the right register input bus 24. In addition, an immediate operand in the instruction register 26 can be used in place of either SR1 or SR2. In this instance, the operand is provided over the instruction operand bus 28 to either of the left register or right register input busses 22 and 24 respectively. The two values placed on the left register input and right register input bus pass to either the adder unit or the multiplier unit. Simultaneously, the busy bit for the specified target register, denoted by BUSY (TR), is set on. Further, if the operation is an adder class operation, SOURCE (TR) is set to ZERO; if it is a multiplier class operation, it is set to ONE. All the actions described thus far occur in one cycle, the cycle in which the instruction is decoded. Some number of cycles later, the value for register TR will be produced. If the value is produced by the adder unit, the result is returned over the adder putaway bus 6; and if it is produced by the multiplier unit, the result is returned over the multiplier putaway bus 10. Therefore, if the source bit is ZERO, indicating an add operation, only the adder putaway bus 6 is monitored by register TR, and conversely if the source bit is ONE, indicating a multiply operation, only the multiplier putaway bus is monitored.

Each cycle, results may be placed on the adder putaway 6 or the multiplier putaway bus 10. Every register with its busy bit on has an invalid value field since the correct current value is being produced by one of the adder or multiplier units. As a result, each busy register expects its new value to return over the adder putaway bus or the multiplier putaway bus 10. If the busy bit is on, and the corresponding source bit is ZERO, the value will return over the adder putaway bus 6. If the source bit is ONE, the value will return over the multiplier putaway bus 10. As values return over a bus, a register designation accompanies the value. If a waiting register sees its register designation appear on the appropriate putaway bus, the new value is gated into the register value field and the busy bit is turned off.

The busy bit for a register stays on from the time an instruction is decoded that designates that register as a target and until the time the new value returns over the appropriate putaway bus for that register. During that time, if a new instruction attempts to decode which also specifies that register as the target register, that instruction is not allowed to decode.

Figure 3:
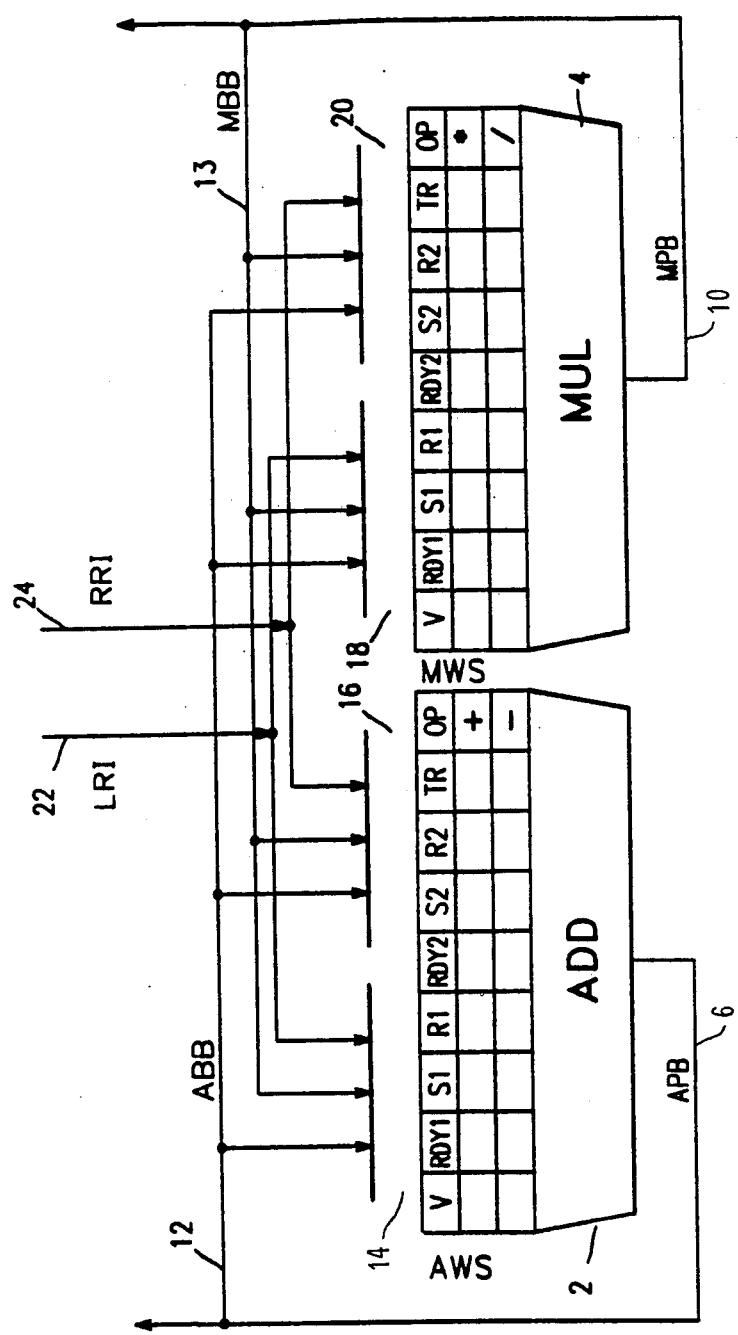
FIG. 3 is a detailed block diagram representation of the adder and multiplier units which are shown generally in FIG. 1.

Refer now to FIG. 3 which is a detailed diagram of the adder and multiplier pipeline execution units. Each waiting station register includes a plurality of bits of information. For example, a valid (V) bit which is indicative of whether the register stage is turned on; for each left waiting station a RDY1 bit which is indicative of whether or not that operand is ready for execution purposes; an S1 bit which is indicative of whether a result for this register is to appear on the adder or multiplier bypass bus, and an R1 field which is the operand value; likewise the right waiting station registers include bits RDY2, S2, and R2; a target register TR is included as well as an OP field which is indicative of which type of arithmetic operation is to be performed.

When a new adder type instruction is decoded, the instruction is entered in encoded form into one of the adder wait stations 14 and 16. When the instruction is entered, the valid (V) bit of the station is turned on and the TR field is set to the TR value specified in the instruction. The instruction also specifies the two source registers, SR1 and SR2 in the register file 8 (See FIG. 2). If BUSY (SR1) is false, VALUE (SR1) is output from register file 8 onto the LRI bus 22 and enters the R1 field of the adder wait station unit 14, and RDY1 is set true to indicate that the left operand is ready. However, if BUSY (SR1) is true, VALUE (SR1) is invalid at this time. Since it is invalid, it is being produced by one of the arithmetic units. If source (R1) is ZERO, then the adder produces the new VALUE (R1) and the new value will appear on the adder putaway bus 6; if SOURCE (R1) is ONE, the multiplier produces the new VALUE (R1) and the new value will appear on the multiplier putaway bus 10. BUSY (SR1) is true, RDY1 is set to false, and S1 is set to SOURCE (SR1). Similarly, the right half of the wait station is set up depending on the value of BUSY (SR2).

At each cycle, if a wait station unit has V, RDY1, and RDY2 all true, then the instruction in the wait station unit can enter the arithmetic pipe and begin producing its result. If V is true, but one or both or RDY1 or RDY2 if false, one or both operands are not yet produced. Suppose RDY1 is false. Then, the needed value appears eventually on either the adder bypass bus 12 or the multiplier bypass bus 13. If RDY1 is false but S1 is ZERO, the value appears on the adder bypass bus 12. Each unready half of a valid wait station monitors the appropriate bypass bus, and when the needed value appears, designated by by a TR value, the register value is entered into the wait station and the ready bit is set. Additionally, the register file accepts the new register value and turns off its corresponding busy bit.

Each register in the register file 8 and each wait station unit portion can accept a value each cycle from any one of the input busses. Significantly, however, each must monitor only one bus. Which bus to monitor is designated simply by the one-bit source designation. Two results can be produced and put away each cycle, as long as they are from different units, that is one from the adder unit and one from the multiplier unit. Clearly, this scheme can be extended to more than two pipelines by utilizing fields larger than one bit.

INDUSTRIAL APPLICABILITY

It is an object of the invention to provide an improved floating point arithmetic unit.

It is another object of the invention to provide an improved floating point arithmetic unit which can produce two arithmetic results per cycle of operation.

It is yet another object of the invention to provide an improved floating point arithmetic unit having separate adder and multiplier putaway busses which can produce an add result on the adder putaway bus and a multiply result on the multiplier putaway bus during each cycle of operation.

What I claim is:

1. In a floating point arithmetic unit, responsive to a sequence of instructions, for producing multiple results per cycle, the combination comprising:
   an adder having first and second inputs and an output;
   a multiplier having first and second inputs and an output;
   a first bus connected to said adder's first and second inputs and output, and also connected to said multiplier'first and second inputs;
   a second bus connected to said multiplier's first and second inputs and output, and also connected to said adder's first and second inputs; and
   a register file having at least a first input connected to said first bus and a second input connected to said second bus and at least first and second outputs connected to inputs of said adder and multiplier, each register stage in said register file including a source register for storing an identification of the source of results on each bus destined for said register so the respective register stages may be connected to a correct one of said first and second busses on which a result is to appear, results from said adder and said multiplier being produced and put away on said first and second busses respectively, during each cycle, permitting decoding of subsequent ones of said instructions while waiting for said results.

2. In a floating point arithmetic unit, responsive to a sequence of instructions, producing two results per cycle, the combination comprising:
   an adder unit having a left adder wait station and a right adder wait station, and an adder output;
   a multiplier unit having a left multiplier wait station and a right multiplier wait station, and including a multiplier output;
   an adder putaway bus connected to said adder output;
   a multiplier putaway bus connected to said multiplier output;
   and adder bypass bus connected to said adder putaway bus and connected to each of said left and right adder wait stations and said left and right multiplier wait stations;
   a multiplier bypass bus connected to said multiplier putaway bus and connected to each of said left and right adder wait stations and said left and right multiplier wait stations; and
   a register file having n registers where n is an integer, each of said n registers having a value field indicative of an operand value, a busy bit having two states, when in a first state indicating that the value field is invalid and when in a second state indicating that the value field is valid, and a source bit having two states indicative of which of said putaway busses to monitor when waiting for a result of a floating point arithmetic operation to be stored in said value field, said adder putaway bus being monitored when said source bit is in said first state indicative of an adder type operation, and said multiplier putaway bus being monitored when said source bit is in said second state indicative of multiplier type operation, results from said adder unit and said multiplier unit being produced and put away on their respective putaway busses during each cycle, permitting decoding of subsequent ones of said sequence of instructions while waiting for said results.

3. The combination claimed in claim 2, wherin said adder wait station and said multiplier wait station each include m registers, where m is an integer, with each of said m registers including at least a valid bit, two ready bits and two bus moniter bits, with said valid bit having two states, when in the first state being indicative of an instruction being placed in the register, and when in the second state indicating that an operand has not been placed in the register, with said ready bits having two states, when in the first state being indicative of the respective operand being ready for an arithmetic operation, and when in the second state being indicative of the operand not being ready for an arithmetic operation, with said bus monitor bits having two states indicative of which of said putaway and bypass bus to monitor when waiting for the result of a floating point arithmetic operation, when in the first state being indicative that the adder putaway and bypass bus should be monitored for a floating point add type result, and when in the second state being indicative that the multiplier putaway and bypass bus should be monitored for a floating point multiply result.

* * * * *